United States Patent
Baima et al.

[11] Patent Number: 5,562,372
[45] Date of Patent: Oct. 8, 1996

[54] METHOD AND A MACHINE FOR MANUFACTURING GEARS

[75] Inventors: Antonio Baima, Nole; Giuseppe Borio, Turin; Leonardo De Carlo, Moncalieri; Aurelio Berruto, Pino Torinese; Roberto Tolomei, Turin; Gianluigi Boscolo, Carmagnola, all of Italy

[73] Assignee: Fiatavio S.p.A., Italy

[21] Appl. No.: 351,839

[22] Filed: Dec. 8, 1994

[30] Foreign Application Priority Data

Dec. 17, 1993 [IT] Italy ............................ T093A0964

[51] Int. Cl.$^6$ .................................................. B23F 5/27
[52] U.S. Cl. ............................. 409/51; 409/31; 409/50
[58] Field of Search ............................. 409/25, 31, 32, 409/33, 34, 48, 50, 51

[56] References Cited

U.S. PATENT DOCUMENTS 2,304,586  12/1942  Miller .................................. 29/103
4,954,028   9/1990  Seroo et al. ....................... 409/26

FOREIGN PATENT DOCUMENTS 0330289  8/1989  European Pat. Off. .
886090   8/1953  Germany .
1096718  5/1961  Germany .
2231520  11/1990  United Kingdom .
WO-A-
8404064  10/1984  WIPO .

Primary Examiner—Daniel W. Howell
Assistant Examiner—Christopher Kirkman
Attorney, Agent, or Firm—Kinney & Lange, P.A.

[57] ABSTRACT

A method for the manufacture of gears, in which a gear adapted for meshing with a toothed pinion is formed by means of a disc tool having a cutting edge exactly the same as the contour of the teeth of the pinion; the tool being positioned so that its cutting edge would be coincident, if the gear were meshed with the pinion, with the contour of the teeth of the pinion itself, and is pivoted about an axis perpendicular to its own axis of rotating; about the pivot axis, the gear is moved translationally along a line of action perpendicular to the axis of rotation of the disc tool itself and is rotated about its own axis perpendicular to the line of action; the ratio of the speeds of rotation of the gear about its axis and the speed of pivoting of the disc tool about is axis being variable in dependence on the position of the zone of contact of the disc with the gear.

8 Claims, 2 Drawing Sheets

METHOD AND A MACHINE FOR MANUFACTURING GEARS

BACKGROUND OF THE INVENTION

The present invention relates to a method and a machine for manufacturing gears and, in particular gears adapted to mesh with cylindrical pinions, of the type commonly known in the trade as face gears.

In the manufacture of face gears in general, it is known to use cutting machines which generate the teeth contours. However, the main disadvantage of these machines is that they make it difficult to work face gears of relatively small diameters and, at the same time, do not achieve satisfactory results in terms of either geometrical or dimensional precision or in terms of the finish of the worked surfaces.

In the manufacture of face gears, it is known to use disc tools which finish the flanks by working on the principle of generatrices and which have a peripheral cutting portion, the half-section of which, defined by a plane passing through the axis of rotation of the disc tool, has a cutting profile which is similar to the profile of the teeth of the aforesaid cylindrical pinion. During the cutting of the gear, the disc tool is driven in cycle in which it is reciprocated relative to the gear to be cut along a path perpendicular to the axis of rotation of the disc tool itself and is pivoted about an axis which is also perpendicular to the axis of rotation of the disc tool; at the same time as the disc tool is pivoted about this latter axis, the gear to be cut is rotated about its own axis in such a way that the ratio of the speed of pivoting of the disc tool to the speed of rotation of the gear being cut is always exactly the same as the transmission ratio resulting from the meshing of the gear with the pinion.

However, disc tools of the type just described have several disadvantages, all owing to the fact that their manufacture is relatively complex and very expensive. In fact, as is known, the theoretical contour of the gear teeth must be corrected in order to avoid relative slipping of the teeth of the gear and those of the pinion and, as the entire cutting operation is carried out without varying the ratio between the speeds of pivoting of the tool and rotation of the gear, the cutting portion of the disc tool needs to have a cutting profile which is different from the contour of the pinion teeth and, in particular, must be worked in such a way as to take account of the aforesaid contour correction, thus incurring not inconsiderable manufacturing costs and problems.

SUMMARY OF THE INVENTION

The object of the present invention is to provide a method for the manufacture of face gears which overcomes the aforesaid disadvantages both simply and inexpensively.

According to the present invention, a method is supplied for the manufacture of a face gear adapted to mesh with an associated toothed pinion defining its own axis; the method including the steps of rotating a gear to be worked about a first axis coincident with an axis of symmetry of the gear itself; of positioning a disc tool relative to the gear so that a peripheral cutting portion of the disc tool having a radial half-section defined by a plane passing through an axis of rotation of the disc tool in the position in which, during meshing, a radial section of a tooth of the pinion defined by a plane perpendicular to the axis of the pinion itself would be located; of rotating the disc tool about its own axis of rotation; of moving the disc tool and the gear to be worked translationally relative to each other along a line of action perpendicular to the axis of rotation of the disc tool, and of pivoting the disc tool about a second axis perpendicular to the axis of rotation of the disc tool itself to vary its inclination to the gear, characterised in that the rotation of the gear about the first axis, the pivoting of the disc tool about the second axis and the translational movement of the disc tool and of the gear relative to each other along the said line of action the said direction are synchronised and carried out simultaneously during the entire process of forming each tooth spacing of the gear to be worked.

The present invention also relates to a machine for the manufacture of face gears.

According to the present invention a machine is provided for the manufacture of a face gear adapted to mesh with a respective toothed pinion defining its own axis, the machine including a table which is rotatable about a first axis and is adapted to retain a gear to be worked arranged with its axis coincident with this first axis; a motor-driven cutting head including a motor-driven disc tool rotatable about its own axis; and drive means for pivoting the disc tool about a second axis perpendicular to the axis of rotation of the disc tool itself, characterised in that the disc tool includes a peripheral cutting portion, the half-section of which, defined by a plane passing through the axis of rotation of the disc tool itself, has a cutting profile which is exactly the same as the contour of a tooth of the pinion defined by a plane perpendicular to the axis of the pinion itself.

BRIEF DESCRIPTION OF THE DRAWINGS

The invention will now be described with reference to the appended drawings, which illustrate one non-limitative embodiment, in which.

DETAILED DESCRIPTION OF THE INVENTION

Figure 1:
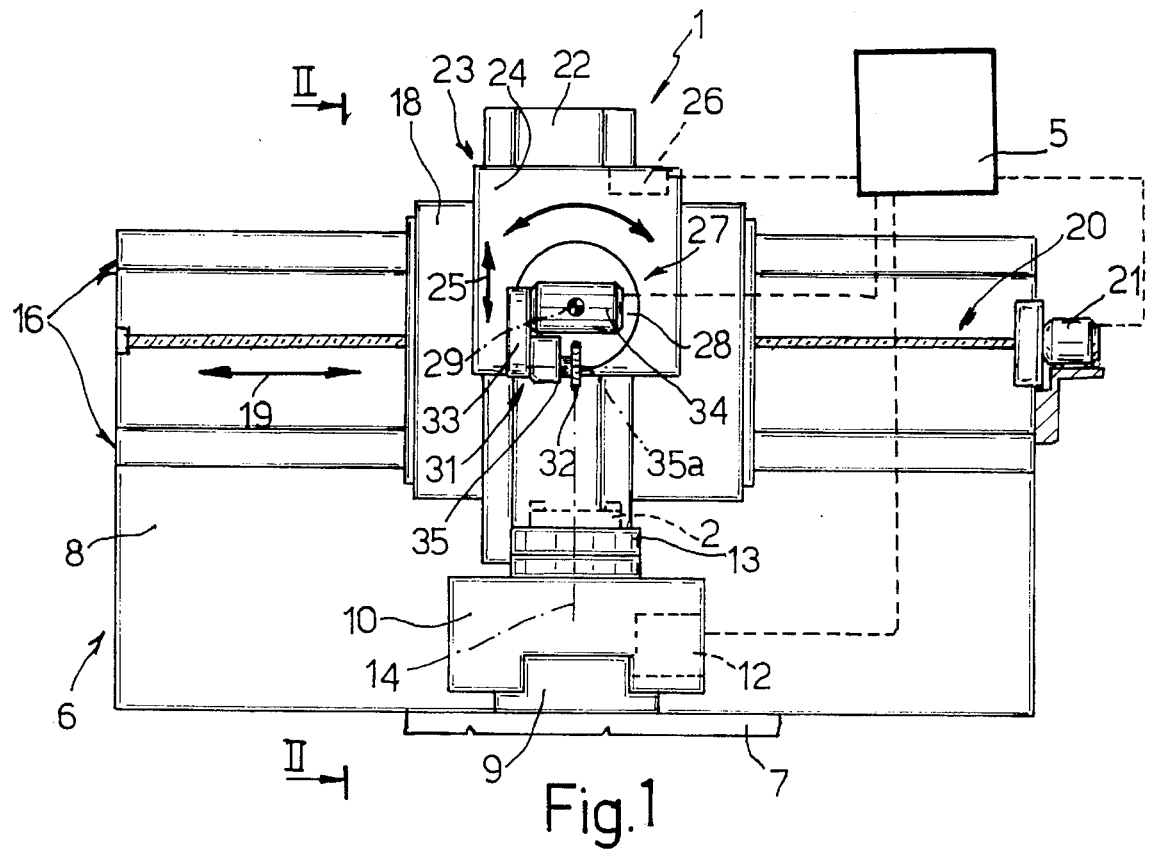
FIG. 1 shows a front elevation of a preferred embodiment of a machine tool according to the present invention.
Figure 3:
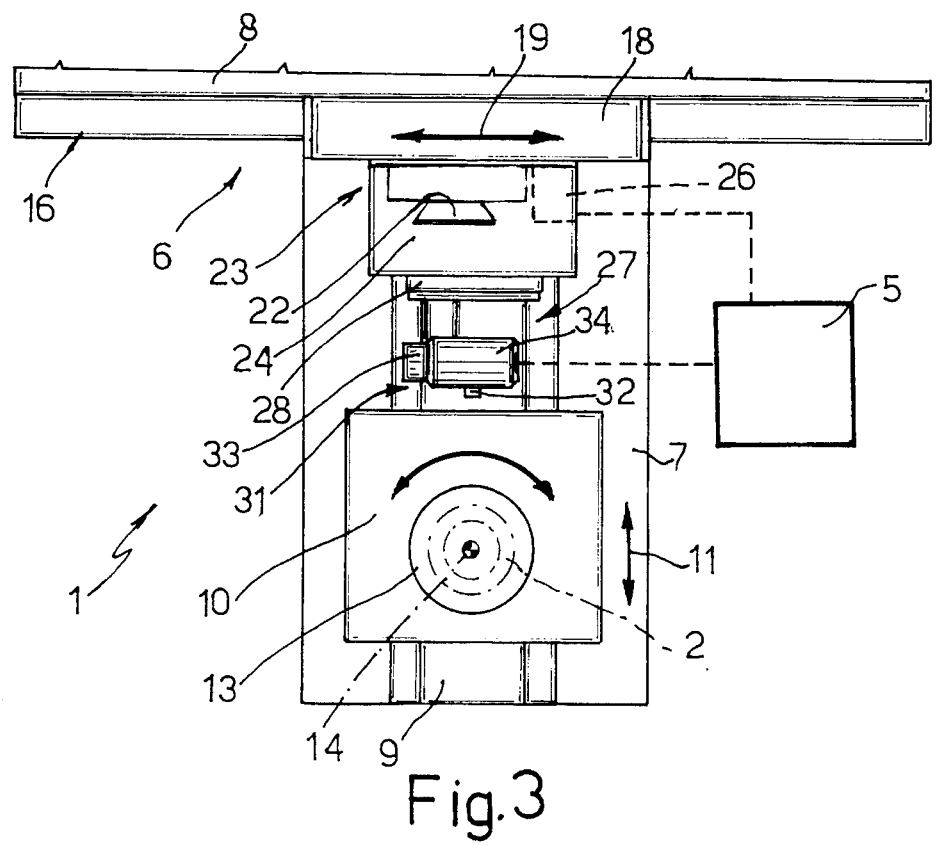
FIG. 3 is a plan view of the machine of FIG. 1.
Figure 2:
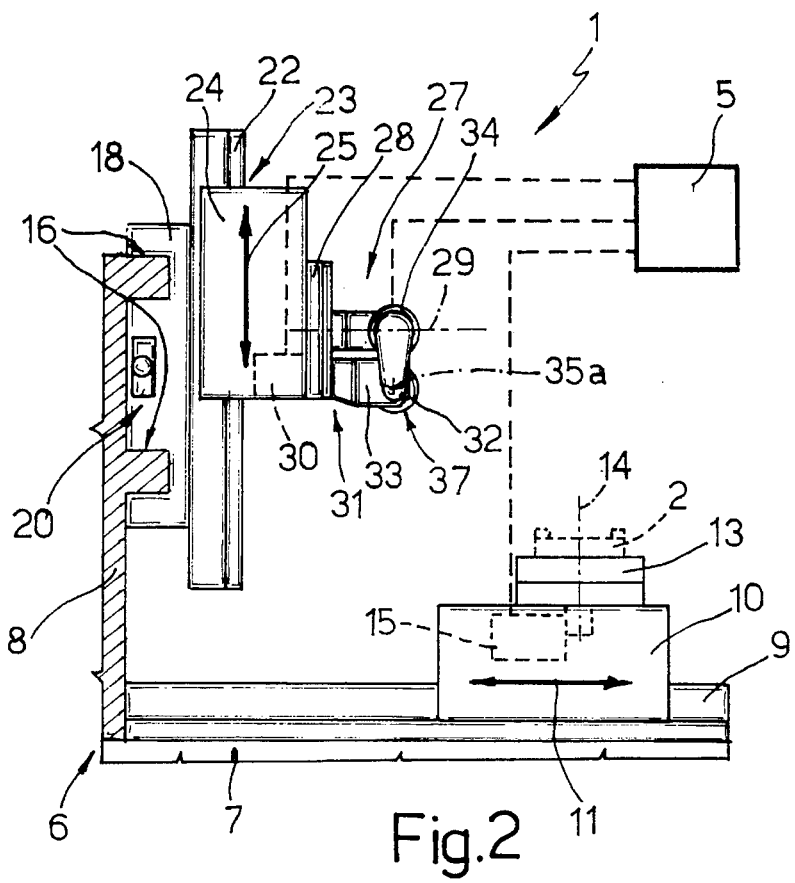
FIG. 2 is a section taken on the line II—II of FIG. 1.

In FIGS. 1 to 3, a machine is indicated 1 for cutting or finishing a gear 2, of the type commonly known in the trade as a face gear, adapted to mesh with a cylindrical pinion 3 (FIG. 4) defining its own axis 4.

The machine 1 is operated and controlled by a central electronic unit 5, in itself known, and includes a frame 6 which includes in turn a base 7 and a vertical wall 8 extending upwardly perpendicular to the base 7. The base 7 carries a securely fixed straight guide 9 to which is coupled a slide 10 slidable on the guide 9 along a line of act ion 11 ( FIGS. 2 and 3 ) driven by a known actuator assembly 12 (FIG. 1) controlled by the central unit 5. The slide 10 supports a worktable 13 which is fixed to the slide 10 for rotation about an axis 14 perpendicular to the line of action 11, is rotatable about this axis 14 by an actuator assembly 15 (FIG. 2), per se known and controlled by the central unit 5, and adapted to support and retain the gear 2 to be worked, arranged with its axis coincident with the axis 14.

With reference to FIGS. 1 and 2, a further straight guide 16 is fixed to the wall 8 so as to extend horizontally perpendicular to the line of action 11 and has a slide 18 coupled thereto for axial sliding movement. This slide 18 is movable on the guide 16 along a line of action 19, by a lead screw assembly 20 actuated by a motor 21 (FIG. 1) controlled by the central unit 5, and supports a guide 22 of an additional slide assembly 23. This slide assembly 23 comprises the guide 22 and a slide 24 slidably fixed thereto and movable along the guide 22 itself along a line of action 25 perpendicular to the lines of action 11 and 19 driven via known transmission means by a motor 26 also controlled by the central unit 5.

Figure 4:
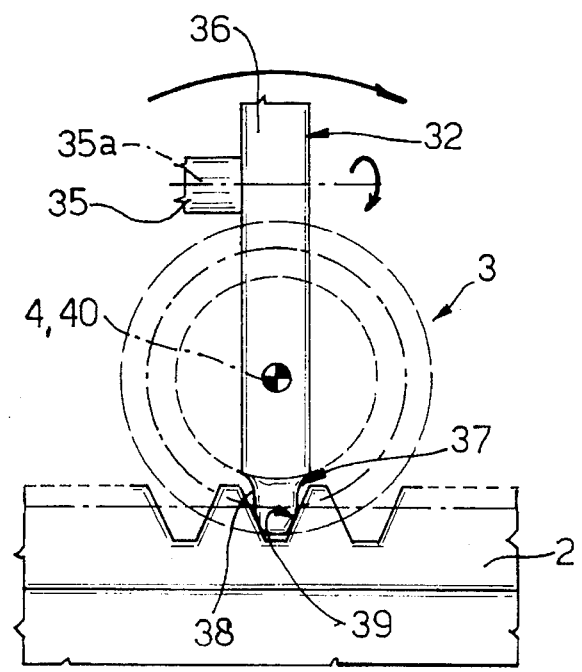
FIG. 4 shows part of the machine of FIG. 1 in an operating position, on an enlarged scale.

The slide 24 supports in turn a cutting head 27 including a cylindrical body 28 which is fixed to the slide 24 for rotation about its own axis 29 which is horizontal and parallel to the line of action 11 and perpendicular to the lines of actions 19 and 25, and which is rotatable relative to the slide 24 itself by a motor 30 (FIG. 2) controlled by the central unit 5. An actuator assembly 31 for a cutting disc 32 for working the face gear 2 arranged on the worktable 13 is connected to the body 28. The assembly 31 constitutes part of the head 27 and includes a reduction unit 33, supported by the body 28 and including in turn an input shaft (not shown) which is connected to the output shaft (not shown) of an electric servomotor 34 controlled by the central unit 5 and an output shaft 35 with an axis 35a. The disc 32 is keyed to the shaft 35 and, as best seen in FIG. 4, includes a central portion 36 and a peripheral cutting portion 37 which can be resharpened and the half-section of which, defined by a plane passing through the axis of rotation 35a of the disc 32, has a profile 38 (FIG. 4) which is exactly the same as the contour of the teeth of the pinion 3. Alternatively, the cutting portion 37 may be made of a material which is highly resistant to wear and thus does not require periodic resharpening.

Operation of the machine 1 will now be described starting from the condition in which the face gear 2 to be worked is arranged on the worktable 13 and the slide 10 is spaced from the wall 8.

The motors 21 and 26 are started in this condition and the disc 32 is moved relative to the table 13, and therefore relative to the gear to be cut, until the aforesaid half-section of the disc 32 is in the same position as a radial section of the pinion 3 defined by a plane perpendicular to the axis 4 of the pinion 3 itself would be in when meshed therewith; in other words, as is shown in FIG. 4, the disc 32 is positioned so that the profile 38 is aligned with a cavity, or tooth-spacing, 39 to be cut, that is in a position whereby the profile 38 of the disc would coincide perfectly with the contour of a tooth of the pinion 3 if the pinion 3 were meshed with the gear 2. At this point, the motors 21, 26 and 30 are actuated simultaneously by the central unit 5 so as to pivot the disc 32 so as to vary its inclination about an axis 40 which is perpendicular to the axis 35a and, in the condition in which the pinion 3 meshed with the gear 2, would coincide with the axis 4 of the pinion 3. The motors 15 and 12 are also actuated simultaneously with the motors 21, 26 and 30 so as, respectively, to rotate the table 13, and therefore the gear 2, about the axis 14 and to reciprocate the table 13, and therefore the gear 2, along the line of action 11.

During the working of a tooth of the gear 2 of this type, the motors 21, 26, 30 and 15 are actuated simultaneously in such a way that the ratio between the speed of pivoting of the disc 32 about the axis 40 and the speed of rotation of the table 13, and therefore of the gear 2, about the axis 14 varies in dependence on the position of the contact zone of the disc 32 with the gear 2 and, in particular, during the working of an intermediate portion of a flank of a tooth of the gear 2, is exactly equal to the transmission ratio resulting from the coupling of the pinion 3 with the gear 2 while it is different from the aforesaid gear ratio, and continuously variable, during the working of tip or base portions of these teeth.

During the working of the gear 2, in the event of the cutting portion 37 being of the resharpenable type, wear of this portion 37 is monitored and as soon as this wear reaches a threshold value the disc 2 is resharpened. After each sharpening, the new diameter of the disc 32 is measured and the position of the axis of rotation 35a of the disc 32 itself is adjusted relative to the table 13 so as to restore the original cutting conditions.

Operation according to the above instructions ensures that each tooth of the gear 2 has a correct contour as soon as it has been cut. It is clear, however, from the above that this correct contour is obtained not with a tool having a cutting profile shaped differently from the contour of the teeth of the pinion 3 and suited specifically to forming the aforesaid correct profile, but is obtained with a disc having a cutting profile which is exactly the same as the contour of each tooth of the pinion 3.

It is clear from the above that the cutting procedure described above enables a disc tool to be used which is relatively simple to manufacture, in particular a disc tool the cutting profile of which is formed simply by copying the contour of the teeth of the pinion which is later to mesh with the gear 2. In comparison with known manufacturing techniques, this eliminates all the operations which had to be carried out on the disc tool in the prior art in order to correct the cutting profile of the disc in relation to the contour of the pinion teeth so as to obtain perfectly accurate teeth on the gear. In particular, in the manufacturing procedure described above, the correction of the profile of the gear teeth is achieved simply by the continuous adjustment, according to the zone of the tooth which is to be worked (tip, root or central portion) of the ratio of the speed of pivoting of the disc 32 about the axis 40 to the speed of rotation of the table 13, and therefore of the gear to be worked, about the axis 14.

In addition, as well as considerably reducing the cost of producing the cutting profile of the disc 32, the above manufacturing technique considerably reduces maintenance costs as it greatly facilitates the resharpening of the disc 32, which must obviously be carried out without altering the profile of the cutting portion 37.

Finally, the manufacturing technique described above enables a high degree of dimensional precision to be achieved as well as excellent finishing of the flanks of the teeth of the gear 2. This is essentially due to the fact that, unlike in the prior art in which the disc is moved axially relative to the gear, in this case the face gear 2 to be worked is moved relative to the disc 32 and this naturally brings a reduction in vibration, both of the support structure of the disc 32 and of the disc itself during work on the gear 2.

We claim:

1. A method for manufacturing a gear adapted to mesh with a respective toothed pinion defining its own axis, the method including the steps of:

rotating a gear to be worked about a first axis coincident with an axis of symmetry of the gear itself;

positioning a disc tool relative to the gear so that a peripheral cutting portion of the disc tool having a radial half-section defined by a plane passing through an axis of rotation of the disc tool arranged in the position in which, during meshing, a radial section of the tooth of the pinion defined by a plane perpendicular to the axis of the pinion itself would be located;

rotating the disc tool about its own axis of rotation;

moving the disc tool and fire gear to be worked translationally relative to each other along a line of action perpendicular to the axis of rotation of the disc tool; and pivoting the disc tool about a second axis perpendicular to the axis of rotation of the disc tool itself to vary its inclination to the gear, wherein the rotation of the gear about the first axis, the pivoting of the disc tool about the second axis and the translational movement of the disc tool and of the gear to be worked relative to each other along the line of action are synchronized and carried out simultaneously during the entire process of forming each tooth spacing of the gear to be worked; and wherein the rotation of the gear about the first axis and the pivoting of the disc tool about the second axis are carried out at respective angular velocities the ratio of which is variable in dependence on the position of the zone of contact of the disc tool with the gear.

2. A method according to claim 1, wherein the second axis is positioned so that it would be coincident with the axis of the pinion if the pinion itself were meshed with the gear.

3. A method according to claim 1, wherein the ratio of the angular velocities of the gear about the first axis and of the disc tool about the second axis are equal to a transmission ratio obtainable when the finished gear is meshed with the pinion only and exclusively during the working of intermediate portions of the tooth surfaces of the gear.

4. A method of claim 1, wherein the relative translational movement of the disc tool and the gear to be worked is carried out by moving the gear along the line of action.

5. A method according to claim 1, wherein it includes the step of monitoring the variation in the diameter of the disc tool and of adjusting the position of the axis of rotation of the disc tool itself relative to the gear accordingly.

6. A machine for manufacturing a gear adapted to mesh with a respective toothed pinion defining its own axis, the machine including:

a table rotatable about a first axis and adapted to retain a gear to be worked arranged with its axis coincident with the first axis;

a motor-driven disc tool rotatable about its own axis; and actuator means for pivoting the disc tool about a second axis perpendicular to the axis of rotation of the disc tool itself;

wherein the disc tool includes a peripheral cutting portion, the half-section of which defined by a plane passing through the axis of rotation of the disc tool itself has a cutting profile which is exactly the same as the contour of the teeth of the pinion defined by a plane perpendicular to the axis of the pinion itself.

7. A machine according to claim 6, wherein it includes first drive means for moving the table towards and away from the disc tool along a first line of action perpendicular to the axis of rotation of the disc tool, and second drive means for rotating the table itself about the first axis.

8. A machine according to claim 7, wherein the actuator means include third and fourth drive means for moving the disc tool along a second line of action and a third line of action respectively, both perpendicular to the first line of action, and additional drive means for rotating the disc tool about an axis perpendicular to the second and third lines of action; electronic control means being provided for controlling all the drive means to act simultaneously and in synchronism.

* * * * *

UNITED STATES PATENT AND TRADEMARK OFFICE
CERTIFICATE OF CORRECTION

PATENT NO. : 5,562,372

DATED : OCTOBER 8, 1996

INVENTOR(S) : ANTONIO BAIMA, GIUSEPPE BORIO, LEONARDO DE CARLO, AURELIO BERRUTO, ROBEETO TOLOMEI, GIANLUIGI BOSCOLO

It is certified that error appears in the above-indentified patent and that said Letters Patent is hereby corrected as shown below: Title page, Under References Cited, please insert --OTHER PUBLICATIONS American Machinist, J. Jablonowski "Generating Gear via Software", July 1983, New York, pages 85-88

Machines Production, Boulogne "Engrenages: Centre de Taillage a CNC", February 1984, No. 372, pages 13-19--

Signed and Sealed this

Fourteenth Day of January, 1997

Attest:

BRUCE LEHMAN

*Attesting Officer*  *Commissioner of Patents and Trademarks*